W. F. RUSSELL.
Flower-Pot.

No. 196,937. Patented Nov. 6, 1877.

Witnesses
G. Bates Howard
Wm. T. Frazier

William F. Russell Inventor
By Howard Bro's
his Attorneys

UNITED STATES PATENT OFFICE.

WILLIAM F. RUSSELL, OF WHEELING, WEST VIRGINIA.

IMPROVEMENT IN FLOWER-POTS.

Specification forming part of Letters Patent No. 196,937, dated November 6, 1877; application filed March 7, 1877.

*To all whom it may concern:*

Be it known that I, WILLIAM F. RUSSELL, of the city of Wheeling, county of Ohio, State of West Virginia, have invented certain Improvements in Flower-Pots; and I hereby declare the following to be a clear, full, and exact description of the same, reference being had to the accompanying drawings.

My invention relates specially to a pot or vessel for growing or raising plants; and consists in constructing the pot or vessel in one piece with its saucer, and with orifices or holes through the side of the pot, around the base, just above the bottom, for the purpose of admitting air and water to the roots of the plant.

In order that others who are skilled in the art to which my invention appertains can make and use the same, I will now proceed to explain its construction, reference being had to the drawings, in which—

Figure 1:
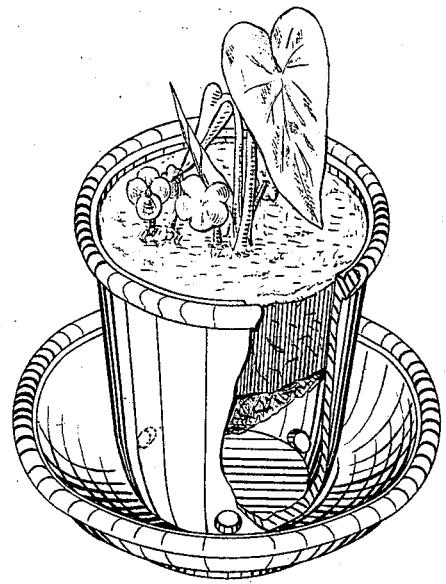
Figure 2:
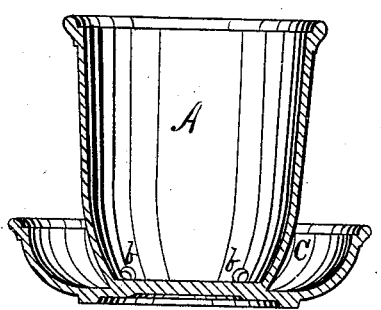
Figure 3:
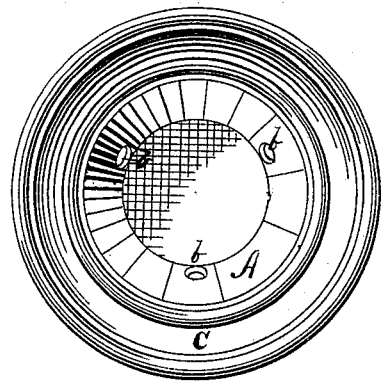

Figure 1 is a perspective view, with a portion of the pot or vessel removed. Fig. 2 is a vertical central section. Fig. 3 is a plan.

Like letters refer to like parts.

In the drawings, A is the pot or vessel; *b b b*, holes or orifices; C, saucer.

In making the pot, I propose to make the pot and saucer separate, and join them together while hot; or I can make the pot with a flat foot, and turn it up to form the saucer.

The pots can be readily manufactured into any shape, form, or design required to suit the wants of the trade or purchaser.

Ordinarily flower-pots are made of clay. For various reasons I prefer to make them of glass or porcelain, because different colors may then be imparted to them for ornamental use. Also, when made of glass or porcelain, the pots do not dry out so rapidly; therefore less watering of the plants is required.

I do not wish to be understood, however, as confining myself strictly to the use of glass or porcelain, as it is evident various materials may be employed equally as well.

Having described my invention, what I claim, and desire to secure by Letters Patent, is—

As a new article of manufacture, the pot A, provided with holes *b b b* through its sides, just above the bottom, and saucer C, the whole made in one piece, substantially as described.

WM. F. RUSSELL.

Witnesses:
G. BATES HOWARD,
WM. ERSKINE.